United States Patent [19]
Ray et al.

[11] Patent Number: 6,013,234
[45] Date of Patent: Jan. 11, 2000

[54] SILICA PIGMENT PARTICULATES

[75] Inventors: Jean-Louis Ray, Collonges Au-Mont D'Or; Maurice Coudurier, Meyzieu, both of France

[73] Assignee: Rhodia Chimie, Courbevoie Cedex, France

[21] Appl. No.: 08/479,530

[22] Filed: Jun. 7, 1995

Related U.S. Application Data

[63] Continuation of application No. 08/237,228, Apr. 28, 1994, abandoned, which is a continuation of application No. 08/023,755, Feb. 16, 1993, abandoned, which is a continuation of application No. 07/885,259, May 20, 1992, abandoned, which is a continuation of application No. 07/430, 161, Nov. 1, 1989, abandoned, which is a continuation of application No. 07/217,431, Jul. 11, 1988, abandoned, which is a continuation of application No. 07/045,375, May 4, 1987, abandoned, which is a continuation of application No. 06/890,477, Jul. 30, 1986, abandoned, which is a continuation of application No. 06/800,290, Nov. 21, 1985, abandoned, which is a continuation of application No. 06/712, 134, Mar. 15, 1985, abandoned, which is a continuation of application No. 06/314,485, Oct. 23, 1981, abandoned, which is a continuation of application No. 06/140,231, Apr. 14, 1980, abandoned.

[30] Foreign Application Priority Data

Apr. 13, 1979 [FR] France ................................. 79 09403

[51] Int. Cl.$^7$ .......................... C01B 33/113; C01B 33/18
[52] U.S. Cl. .......................... 423/335; 423/339; 106/482
[58] Field of Search .................................. 423/335, 339; 106/482, 287.34

[56] References Cited

U.S. PATENT DOCUMENTS

| 3,383,172 | 5/1968 | Biegler ..................................... 423/335 |
| 3,867,156 | 2/1975 | Fukumoto et al. ..................... 106/483 |
| 4,094,771 | 6/1978 | Brandt et al. ........................... 423/335 |
| 4,179,431 | 12/1979 | Kilian et al. ............................ 423/339 |
| 5,009,874 | 4/1991 | Parmentier et al. .................... 423/339 |
| 5,395,605 | 3/1995 | Billion et al. ........................... 423/339 |

*Primary Examiner*—C. Melissa Koslow
*Attorney, Agent, or Firm*—Burns, Doane, Swecker & Mathis, L.L.P.

[57] ABSTRACT

Dry, freely-flowing, water-insoluble but readily dispersible, solid and homogeneous silica pigment particulates essentially spheroidal in geometrical configuration and having a mean particle size in excess of 80$\mu$, preferably in excess of 150$\mu$, are prepared by atomizing to dryness a pulverulent aqueous suspension of silica having a solids contact in excess of 18%. Such silica pigment particulates, advantageously comprised of precipitated silica, are well adapted as reinforcing fillers for elastomeric matrices.

28 Claims, 3 Drawing Sheets

SILICA PIGMENT PARTICULATES

This application is a continuation of application Ser. No. 08/237,228, filed Apr. 28, 1994; now abandoned; which is a continuation of application Ser. No. 08/023,755, filed Feb. 16, 1993 now abandoned; which is a continuation of application Ser. No. 07/885,259, filed May 20, 1992 now abandoned; which is a continuation of application Ser. No. 07/430,161, filed Nov. 1, 1989 now abandoned; which is a continuation of application Ser. No. 07/217,431, filed Jul. 11, 1988 now abandoned; which is a continuation of application Ser. No. 07/045,375, filed May 4, 1987 now abandoned; which is a continuation of application Ser. No. 06/890,477, filed Jul. 30, 1986 now abandoned; which is a continuation of application Ser. No. 06/800,290, filed Nov. 21, 1985 now abandoned; which is a continuation of application Ser. No. 06/712,134, filed Mar. 15, 1985 now abandoned; which is a continuation of application Ser. No. 06/314,485, filed Oct. 23, 1981 now abandoned; which is a continuation of application Ser. No. 06/140,231, filed Apr. 14, 1980, now abandoned.

BACKGROUND OF THE INVENTION

1. Field of the Invention

The present invention relates to novel siliceous particulates, and, more especially, to such particulates, advantageously beads, useful as silica pigments and reinforcing fillers for elastomeric matrices. The invention also features a novel process for the preparation of such readily dispersible siliceous particulates.

2. Description of the Prior Art

It has long been known to this art to attempt to substitute the white fillers/pigments, such as silica, for such conventional black fillers as carbon black.

However, such alternate fillers must first be capable of ready dispersion within a given elastomeric matrix. Furthermore, the elastomer thus reinforced has to be imbued, not only with good static mechanical properties, but also with the especial dynamic properties required for any given intended application thereof.

In the particular application of tire reinforcement, for example, such fillers must not give rise to internal heating when the tire is in dynamic use.

An attempt was first made to establish certain correlations between silica and its behavior in elastomers by analogy to the carbon black art. Thus, it was attempted to establish any relationship between the BET surface area and such behavior. But this approach produced results which not only were unsatisfactory, but even contradictory. Indeed, any such correlations, which sometimes appear to be incorrect, seem to be at least partially due to the differences in morphology between the carbon blacks and the silicas.

In particular, the carbon blacks which are used as reinforcing fillers typically have a high primary structure and a weak secondary structure, whereas the secondary structure of the precipitated silicas is far from being negligible as compared to their primary structure. The primary structure is understood to be the result of coalescence of the ultimate particles which form the aggregates. It will of course be appreciated that the bonds between ultimate particles in an aggregate are strong chemical bonds.

The secondary structure is known to be the result of physical interactions between the aggregates, to form agglomerates. In contrast to the case of the primary structure, these bonds are weak and are physical in nature. Moreover, it too has been postulated that the primary structure of silica is different from that of the carbon blacks.

Thus, this art is replete with attempts to alter the morphology of precipitated silicas in order to improve their behavior/properties. Compare, for example, published French patent application No. 76/16962 which features a silica having a CTAB surface area ranging from 80 to 125 $m^2/g$ and a structural index of at least 0.80.

Also, a silica in powder form has the known disadvantage of forming dust when handled. It was therefore ascertained to be preferred to granulate the silica.

With such granulated silica it was determined, however, (a) that the degree or extent of dispersion was less with granulated than with non-granulated silica, and (b) that the degree of reinforcement therewith was also less, as can easily be demonstrated via the mechanical properties of the vulcanized, reinforced mixtures prepared therefrom.

Various solutions too have been proposed to overcome the aforesaid disadvantages.

For example, it was proposed in published French patent application No. 71/36250 to granulate the silica in a pan or drum-type granulator, with water as the binder, and to carry out the granulation under agitation, at a pH of less than 6.3.

The disadvantage of such a proposal is the very heterogeneous form of the granulated materials (very broad range of granulometry, high degree of attrition), the difficulties naturally associated with such long drying times (8 to 24 hours) and the need for highly viscous liquids (silica cake referred to as a "suspension" in the patent application) to be homogeneously mixed with powders in a preliminary stage (requiring the use either of very sophisticated, continuous mixers, or very simple but discontinuous mixers of kneading type).

And in U.S. Pat. Nos. 3,646,183 and 3,787,221 it is proposed to granulate precipitated silica, utilizing a surfactant as the binder.

Unfortunately, the presence of the surfactant complicates the drying procedure, i.e., possible decomposition of the binder, and the need for low temperature drying operations with their attendant low thermal yields.

According to U.S. Pat. No. 3,902,915 the problem of granulation is particularly acute when utilizing a rotating drum dryer. This provides too compact a granulate which will not adequately disperse in a composition destined for the making of rubber.

This patent, accordingly, features use of a fluidized bed, but the slurry resulting from the filter cake has a low content in dry solids.

Another method envisaged for the aforesaid drying operation is predicated upon utilizing atomization techniques. On the one hand, however, this provides a finely divided silica, but on the other hand, it is art accepted that a precipitated silica relatively rich in dry solids content cannot be atomized except when working with an acid pH of at most 4.

But in this case the material has to be post-neutralized, as described in French Patent No. 2,230,645; this makes the process complex and markedly increases the cost of the operation.

It too is known that the silica powders can either be compressed or compacted in an attempt to circumvent the aforenoted drawbacks. In such case, however, the products obtained do not flow easily, have low resistance to attrition because of the presence of sharp edges, and do not disperse properly because of their high degree of compactness.

Furthermore, in carrying out such processes, large quantities of material have to be recycled, which of course makes the process considerably more difficult.

Finally, French Patent No. 2,249,834 describes a process which is carried out during the formation of the beads or particulates and which comprises adding to the silica or silicate 5 to 60% by weight of diluent oil emulsified with the water employed to form the beads.

But this process is awkward and inflexible (since it is inextricably tied to the formulation of rubber). It in fact also requires two drying operations, one performed upon the silica itself and the other upon the silica plus the oil-in-water emulsion.

And as for the known method which comprises heating a composition based on grains of silica hydrogel for less than 5 seconds, at from 300 to 1000° C., as described in French Patent No. 2,332,234, this unfortunately also does not provide a product capable of meeting all requirements for use as a reinforcing filler in elastomeric matrices (too compact, 40 to 70 bars pressure, and high cost).

Thus, serious need continues to exist in this art for siliceous pigments and reinforcing fillers which avoid all of those noted, and notable, drawbacks and disadvantages above outlined.

SUMMARY OF THE INVENTION

Accordingly, a major object of the present invention is the provision of novel siliceous particulates well adapted as silica pigments and reinforcing fillers for elastomeric matrices.

Briefly, this invention features readily dispersible silica particulates in bead or spheroidal form, which particulates are solid and homogeneous, and have a mean particle size in excess of $80\mu$.

DETAILED DESCRIPTION OF THE INVENTION

Figure 1:
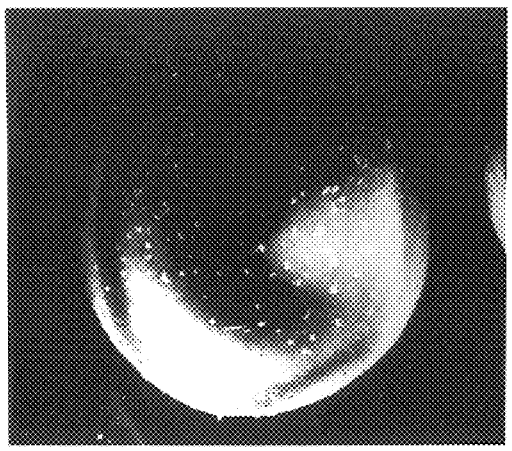
FIG. 1 is an enlarged photograph of a particulate according to the invention.

More particularly according to the present invention, by silica or silica-based pigment, there is intended any water-insoluble solid obtained by precipitation from a liquid, with or without preliminary or subsequent treatment, and essentially comprising a mixture of substances selected from the group consisting of the silicic acids, silica and the silicates, or any admixtures thereof, or any combination of such mixtures and admixtures with a wide variety of metallic salts; especially noteworthy are the silicas, silicates and aluminosilicates.

In a preferred embodiment of the invention, the pigments are comprised of precipitated silica.

In this embodiment, such pigments are advantageously in the form of solid pellets (or beads) having:

(i) A mean particle size of more than $150\mu$, and preferably from 200 to $300\mu$;

(ii) A fill density in compacted state, in accordance with AFNOR standard No. 030100, of more than 0.200, and preferably from 0.28 to 0.32.

(iii) A BET surface area of from 100 to 350 m$^2$/g;

(iv) A CTAB surface area of from 100 to 350 m$^2$/g; and (v) A specific volume $V_{600}$ of from 0.7 to 1.1.

The BET specific surface area is determined by the method of Braunauer, Emmett and Teller described in *Journal of the American Chemical Society*, vol. 60, p. 309 (February, 1938).

The CTAB surface area is defined as: external surface area by adsorption of cetyl trimethyl ammonium bromide at pH 9 by the method described at Jay, Janzen and G. Kraus, *Rubber Chemistry and Technology*, 44, pp. 1278–1296 (1971).

The specific volume of the silica $V_{600}$ is determined from an established amount of silica, compacted into a steel die having an internal diameter of 25 mm and a height of 80 mm; 3 g of: silica is added, then a piston or ram is positioned over the silica and sufficient weight is added to the piston that it exerts a compacting pressure of 600 kg/cm$^2$ upon the silica. The difference between the initial and compacted volumes reflects the volume of the inter-aggregate interstices and is characteristic of the primary structure of the silica.

Moreover, the particulates of the invention are remarkably free-flowing, on the order of a few seconds, an improvement by a multiple of from 10 to 50 over the corresponding products in powder form. It thus logically follows that the subject particulates will not form dust when the vulcanized materials comprising same are treated in a mixer.

Flowability as defined herein is determined as the time required for the product to flow into appropriate receptable having a calibrated aperture while under slight vibration. While this is a relative measurement depending upon the particular operating conditions, it does serve as a valid comparison with any non-spherical product.

The invention also features a novel method for preparing, the aforesaid particulates.

Consistent with such method, a suspension obtained via known precipitation reaction is further processed by means of an atomizer.

In contrast with the typical practice known to this art, the process of the invention comprises the downstream treatment of a pulverulent slurry of precipitated silica which is rich in dry solids content, with the content in dry solids advantageously being in excess of 18%, and being of high viscosity, i.e., having a viscosity such that atomization is only narrowly enabled and whereby but slight increase thereof would serve to preclude any atomization through a narrow orifice.

It is also known that the suspension of precipitation is typically lacking in dry solids content and that washing is usually required.

In accordance with this invention, therefore, either the suspension of precipitation is filtered in conventional manner and the dry solids recycled to provide a filter cake rich in dry solids content, or, alternatively, other known method is employed, such as horizontal or vertical filtering, whereby the desired slurry is obtained directly.

But the slurry is not yet in a condition as would enable same to be atomized or sprayed; in particular, it remains too highly viscous, on the order of 4000 poises, measured at a shear rate of $10^3$ second$^{-1}$.

Accordingly, such slurry is first comminuted or milled to reduce the viscosity thereof and to transform the slurry into a state indeed permitting the pumping required for spraying or atomization and to eliminate the largest particles. The uniformity of the spraying operation depends on the homogeneity of the pulverulent slurry and the absence therein of any large particles over 150μ, in particle size, the pulverulent slurry shaving-a dry solids content in excess of 18%, and advantageously from 20 to 25%, and a viscosity (again measured at a speed gradient of $10^3$ second$^{-1}$) preferably ranging from 100 to 1000 poises.

As noted hereinabove, the pH of such product is on the same order as that existing upon completion of the precipitation, i.e., 4 or more, and preferably from 4.5 to 6.

The suspension thus obtained is then subjected to a spraying operation of any known type.

For example, one such technique is a spraying technique utilizing liquid pressure nozzles, as described in the text by Masters, *Spray Drying*, p. 169 ff, Second Edition, George Godwin Ltd. (London); John Wiley & Son (New York).

In accordance with the invention, operation is in this case permitted at relatively low pressures, on the order of 20 to 40 bars, on the pulverulent suspension.

Obviously, the aforenoted viscosity range is only given as exemplary of those occasions where the viscosity of the suspension has to be taken into account. This may be modified in appropriate cases by using compounds such as carboxymethyl cellulose, alginates, etc., to increase the viscosity, or acids to reduce same.

Certain atomizations utilizing two different fluids may be employed equally as well, with the atomizing fluid being a high speed gas, as described in Perry & Chilton, *Chemical Engineers Handbook*, pp. 18–61, 5th Edition, or in the Masters text, supra, p. 206 ff.

The lowering of the viscosity via pulverization or comminution is carried out by any known means, or combinations thereof.

In particular, a mill of colloidal type, or a ball mill, are admirably well suited for such operation.

In order to further illustrate the present invention and the advantages thereof, the following specific examples are given, it being understood that same are intended only as illustrative and in nowise limitative.

EXAMPLE 1

88.6 liters of an aqueous silicate solution containing 136.2 g/l of $SiO_2$ and 38.9 g/l of $Na_2O$ were first poured into a 200 liter reaction vessel. 25.6 liters of sulfuric acid having a density of 1.050 were then added thereto over a period of 21 minutes, after which the addition of acid was terminated for 10 minutes. The reaction temperature was 73° C.

37.5 liters of sulfuric acid were next added, to adjust the pH of the reaction mixture to 7.5. 9 liters of silicate solution containing 234 g/l of $SiO_2$ and 69.4 g/l of $Na_2O$ and 13.5 liters of the acid were then simultaneously added thereto, at the respective rates of 0.3 l/mn and 0.45 l/mn for 30 minutes, such that the pH was first maintained at 7.5 and then reduced to 4. The amount of dry solids in the medium was 78.8 g/l.

The resulting suspension was next charged onto a horizontal filter press and its content in solids was adjusted to 23%. The viscosity of the filter cake was then 400 poises, measured at a gradient of 10 second$^{-1}$. The filter cake was then comminuted, first with a double screw shredder and then with a colloidal pulverizer.

A suspension having a viscosity of approximately 200 poises, also measured at a gradient of $10^3$ second$^{-1}$, was obtained, the particle sizes thereof being substantially less than 150μ.

Said suspension was thence spray-dried utilizing a two-fluid atomizer, the same being coaxially supplied with both the suspension to be spray-dried, and with air, under the following conditions: air inlet temperature, 480° C.; air outlet temperature, 135° C.; and with the air being supplied under an absolute pressure of 4 bars and the liquid under an absolute pressure of 1.5 bar.

EXAMPLE 2

This example was identical to that of Example 1, insofar as the preparation of the suspension of the precipitated silica is concerned, but instead of said suspension being filtered, comminuted and spray-dried according to the invention, the suspension of precipitated silica was simply filtered on a rotating filter to provide a filter cake having an 18% content in dry solids which was then air dried to yield a dusty powder.

EXAMPLE 3

This example was a combination of Examples 1 and 2, with a filter cake being obtained consistent with Example 1, but by utilizing a conventional rotating filter, thus providing a filter cake having an 18% content in dry solids, as per Example 2.

2.5 kgs of such filter cake and 665 g of the silica powder obtained in Example 2 were intimately mixed together in a Lödige blender to give an admixture containing 67% of dry solids. Such admixture was comminuted in an extruder comprising two counter-rotating cylinders pressing against each other, one cylinder being perforated and the mixture being charged therein through a hopper arrangement located above the two cylinders. This operation produced a granulated product in the form of pelletized extrusions expressed through 5 mm orifices, which extrusions were then dried in an oven at 140° C.

EXAMPLE 4

The powdered silica obtained in Example 2 was first deaerated under vacuum and was then fed into a roller-type press under pressures of 5 and 20 bars.

The quality of the resulting product is expressed in terms of the formation of dust therefrom and its resistance to attrition. This was assessed by establishing a stable fluidized bed from said product and a vector gas (compressed air). The bed was suspended and continuously freed of the dust by means of the pressure exerted by the gas. The fines entrained by the gas stream were collected and weighed in a cellulosic container of predetermined weight, enabling the weight of the evolved fines to be monitored as a function of time. In actuality, 20 g of product was fluidized in a tube charged with dried compressed air through an aperture 0.4 mm in diameter; the velocity in the tube was 0.40 m/s and the pressure upstream of the aperture was 0.25 bar. The weight loss was measured as a function of time. A product obtained according to the invention, prepared consistent with Example 1, and the product of Example 4, were tested to provide comparative results.

Dust formation and abrasion were also measured in accordance with the standard DIN 583.

WEIGHT LOSS IN PERCENTAGE

| | Example | |
|---|---|---|
| Time | 1 | 4 |
| 10 mn | 1 | 4.5 |
| 1 hour | 1.5 | 7.5 |
| 2 hours | 1.7 | 10.2 |
| 3 hours | 1.8 | 14.5 |

It will be seen from the foregoing table that the product not within the ambit of the invention forms dust much more rapidly, and that the dust formation was progressive as a result of intense attrition.

EXAMPLE 5

The procedure of Example 1 was repeated, but utilizing the immediately aforenoted liquid pressure spray, the same being at a liquid pressure of 20 bars.

The results of the aforesaid five examples are set forth in the following Table I, such that the physicochemical properties of the various final products can be compared, as well as the characteristics of said final products in their application as reinforcing fillers for elastomers.

The Table IV which follows reflects the behavior of the various pigments in rubber.

The following rheological properties were estimated: minimum torque, maximum torque, optimum cure time as described in "Continuous Measurement of the Cure Rate of Rubber"—ASTM Special Technical Publication No. 383.

Tensile strength was also measured, in accordance to with French standard T 46 002, test piece A1.

As earlier mentioned, it is known that a silica must be well dispersed. Said dispersion was herefore visually demonstrated by assigning a certain number of crosses, "x", from 0 representing zero dispersion, to 3x representing good dispersion.

Sections were taken from a silica filler reinforced vulcanized elastomeric material, with the sides thereof being a few microns thick. The silica was preferentially colored with methyl red to make it visible by optical microscopy. The silica initially had the same refractive index as the elastomer.

The percentage of dispersion is herein defined as the percentage of silica dispersed in agglomerates of less than 8 microns.

It was calculated as follows:

$$\% \text{ dispersion} - 100 = SX/L,$$

wherein X=total number of squares having a dimension of 17 microns in a network of 10,000 total squares; S=surface swelling factor due to the action of swelling agent, with S being calculated as $$\frac{\text{area of section after swelling}}{\text{area of section before swelling}};$$

and L=percentage by volume of silica relative to total amount of rubber. Weight of silica×specific volume of silica×100=weight of mixture×specific volume of mixture. Similarly, by varying the magnification of the optical microscope, one can determine the percentage of silica dispersed in agglomerates of less than 3 and less than 0.7 micron, each square of the network having a linear dimension of 6 and 1.4 micron at the various magnifications. The higher the percentage, the better the dispersion will be.

The following composition was used as the reference vulcanized material:

| | Parts by weight |
|---|---|
| Rubber SBR 1,509 | 95 |
| Active ZnO | 3.00 |
| Stearic acid | 1.00 |
| Polyethylene glycol MW = 4,000 (PEG 4,000) | 2.40 |
| Antioxidant (octyldiphenylamine PERMANAX OD) | 2.00 |
| N-Cyclohexyl-2-benzothiazyl sulfenamide (VULCAFOR CBS) | 1.20 |
| Benzothiazyl disulfide (VULCAFOR MBTS) | 1.20 |
| Diorthotolylguanidine (VULCAFOR DOTG) | 1.40 |
| Tetramethylthiuram disulfide (VULCAFOR TMTD) | 0.20 |
| Silica | 40.00 |
| Masterbatch { SBR | 4.75 |
| { Sulfur | 2.5 |

EXAMPLES 6 to 10

These particular examples are similar to the Examples 1 to 5, except that the initial method for preparing the silica was different.

To a silicate solution containing 145 g/l of $SiO_2$ and 42 g/l of $Na_2O$, 30.6 liters of sulfuric acid having a density of 1.050 were added thereto over a period of 23 minutes, and then such said addition was terminated for 10 minutes.

Then, 62.2 liters of sulfuric acid were added thereto over 47 minutes until a pH of 4.2 was attained, and the reaction mixture was permitted to stabilize for 10 minutes. The reaction temperature was 70° C.

The overall procedure was otherwise the same as in the preceding examples:

Example 6 corresponded to Example 1,
Example 7 corresponded to Example 2,
Example 8 corresponded to Example 3,
Example 9 corresponded to Example 4,
Example 10 corresponded to Example 5.

The characteristics of the various final products and their behavior in rubber are summarized in the Table II which follows.

Figure 2:
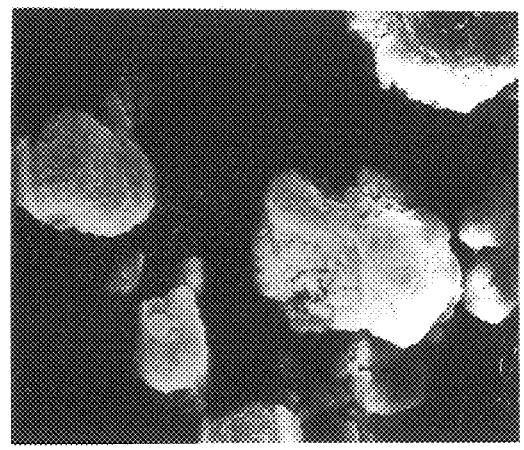
FIG. 2 is an enlarged photograph of a powder in accordance with Example 1.

As additional illustrations of the product according to the invention, FIG. 1 is an enlarged photograph of a pellet according to the invention (Example 5), and FIG. 2 is an enlarged photograph of the corresponding powder (Example 1).

The test comprises placing one liter of the product to be studied in an Erlenmeyer flask having a neck 4.4 cm in diameter. The flask is rocked and the flowability of the product visually observed.

Figure 3:
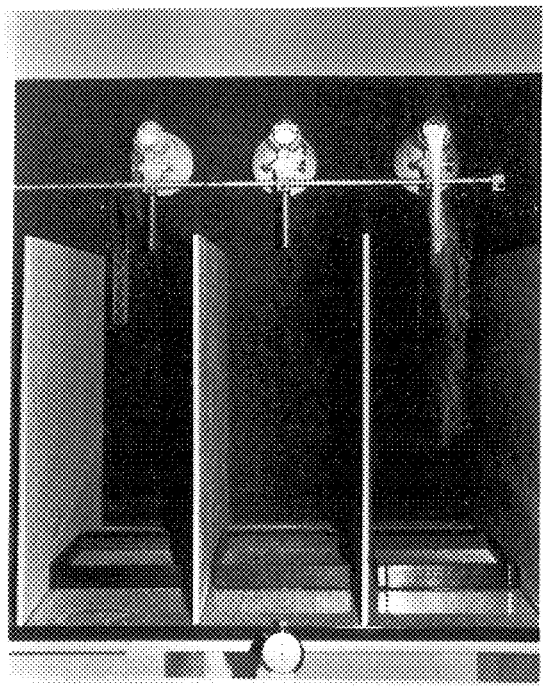
FIGS. 3–6 are photographs of an experiment comparing the flowability of various products, with each Figure in sequence being of a photograph taken two seconds subsequent to the photograph in the previous Figure.
Figure 4:
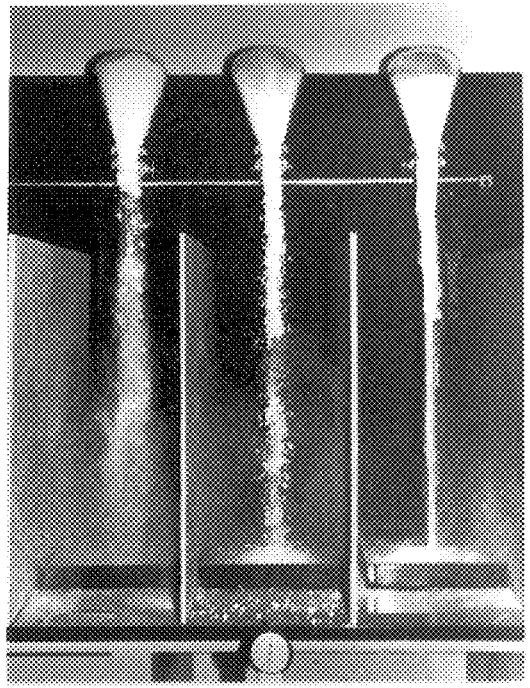
Figure 5:
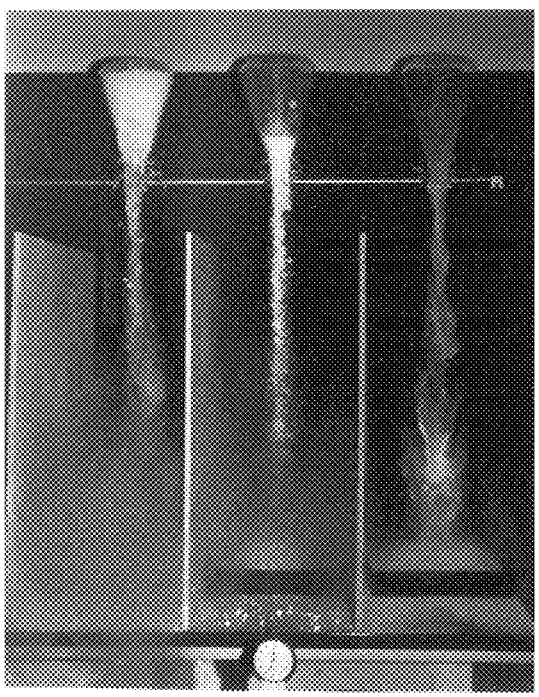
Figure 6:
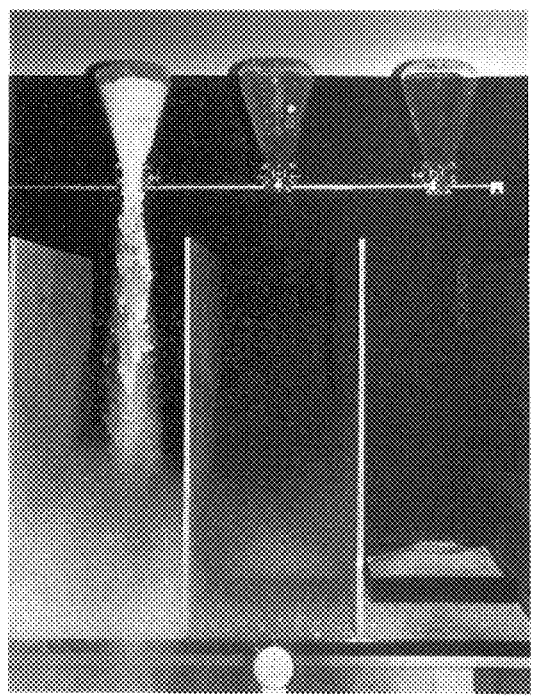

The height from which the product is spilled is 63 cm. The experiment is shown in FIG. 3 at the very instance that the product begins to flow/spill, and then, in the subsequent photographs, every two seconds thereafter.

It will be seen from the first photograph that the product according to the invention has a fluid appearance and was more freely flowing from the very outset. It can then clearly be seen that the product according to the invention not only flows better than a product in powder form (that prepared as in Example 2), but also flows better than a granulated product as prepared in Example 4. The granulated product is in the center of the photographs, while the product according to the invention (Example 5) is at the right hand side thereof.

The product of the invention was then examined by testing it in various formulations, SBR, polyisoprene, E.P.D.M. or SBR in solution (see Tables III and IV).

In these tables, the various products are in accordance with the following chemical formulae and/or standards:

SBR 1509: Butadiene Styrene Rubber—see page 25, *The Synthetic Rubber Manual,* 76th Edition.

SBR 1712: Butadiene Styrene Rubber—see page 28, *The Synthetic Rubber Manual,* 76th Edition.

SBR 1220: Butadiene Rubber—see page 32, *The Synthetic Rubber Manual,* 76th Edition.

PEG 4000: Polyethylene glycol having a molecular weight of approximately 4000.

Petroleum distillation oil

Synthesized oil

Antioxidant PERMANAX OD—Octyldiphenylamine

Antioxidant PERMANAX IPPD—N-Isopropyl-N'-phenyl-paraphenylene diamine

Antioxidant PERMANAX 6 PPD N-1,3-Dimethylbutyl-N'-phenyl-p-phenylene diamine

VULCAFOR CBS—N-Cyclohexyl-2-benzothiazyl sulfenamide

VULCAFOR DOTG—Diorthotolylguanidine

VULCAFOR TMTD—Tetramethylthiuram disulfide

VULCAFOR MBTS—Benzothiazyl disulfide

NATSYN—Polyisoprene (GOODYEAR)

SOLPRENE 2106—SBR in solution (PHILLIPS)

KELTAN 6505—Ethylene propylene diene monomer from D.S.M.

MBT—2-Mercaptobenzothiazole

L.D.A.—Zinc N-diethyl dithiocarbamate accelerator (BAYER)

| | | |
|---|---|---|
| Masterbatch A (accelerators) | SBR | 5 |
| | MBTS | 0.75 |
| | DOTG | 1.5 |
| | | 7.25 |
| Masterbatch B (sulfur) | SBR | 4.75 |
| | Sulfur | 2.5 |
| | | 7.25 |

This behavior of the various products in rubber is summarized in Tables V to VII.

TABLE I

| PROPERTIES | Ex. 1 | Ex. 2 | Ex. 3 | Ex. 4 | Ex. 5 | |
|---|---|---|---|---|---|---|
| pH | 6.9 | 6.9 | 6.9 | 6.9 | 6.9 | 6.9 |
| Heat Loss, % | 10.6 | 11.5 | 10.9 | 10.9 | 11.3 | 10.6 |
| Fill density when compacted (Afnor 030,100) | 0.294 | 0.200 | — | 0.29 | 0.30 | 0.294 |
| CTAB $m^2/g$ | 150. | 151 | 154 | 150 | | 150 |
| BET $m^2/g$ | 150 | 158 | 170 | 160 | | 150 |
| $V_{600}$ cc/g | 0.80 | 0.82 | 0.7 | 0.7 | 0.7 | 0.80 |
| Granulometry | | | | | | |
| % retained on Sieve | | | 5 mm | 2 to 5 mm | | |
| 250μ (dry) | 29 | 0 | — | — | — | 20 |
| 147μ (dry) | 40 | 6 | — | — | — | 80 |
| 44μ (moist) | 75 | 60 | — | — | — | 98 |
| Flowability | 5 s | 3 mn | — | — | — | 6 s |
| Rubber | | | | | | |
| Cm | 7.0 | 10.0 | 10.0 | 6.0 | 6.0 | 7.5 |
| CM | 95.5 | 104 | 97.5 | 92.0 | 91.5 | 88 |
| Optimal Cure time | 45 mn 45 s | 3 mn 45 s | 4 mn 30 s | 4 mn 00 s | 4 mn 10 s | 3 mn 40 s |
| Tensile strength $kg/cm^2$ | 136 | 145 | 118.0 | 134 | 132 | 143 |
| Dispersion | | | | | | |
| Visual | xxx | xxx | xxx | 0 | 0 | xxx |
| Optical % at 3μ | 99 | 98.5 | 85 | 88 | 87 | 99 |
| Dust formation and abrasion as in DIN 53 583, in % by weight | | | | | 12 3.5 | 13 0.5 |

TABLE II

| PROPERTIES | Ex. 6 | Ex. 7 | Ex. 8 | Ex. 9 | | Ex. 10 |
|---|---|---|---|---|---|---|
| pH | 6.7 | 6.8 | 6.7 | 6.8 | 6.8 | 6.8 |
| Heat Loss, % | 10.5 | 11.0 | 11.0 | 10.9 | 11.2 | 10.9 |
| Fill density when compacted | 0.286 | 0.200 | 0.310 | 9.29 | 0.31 | 0.280 |
| CTAB $m^2/g$ | 158 | 168 | 184 | | 170 | 171 |
| BET $m^2/g$ | 250 | 270 | 246 | | 220 | 271 |
| $V_{600}$ cc/g | 1.05 | 1.1 | 1.0 | 1.0 | 0.95 | 1.0 |

TABLE II-continued

| PROPERTIES | Ex. 6 | Ex. 7 | Ex. 8 | Ex. 9 | Ex. 10 |
|---|---|---|---|---|---|
| Granulometry | | | | | |
| % retained on Sieve | | | 5 mm | 2 to 5 mm | |
| 250μ (dry) | 6 | 0 | — | — | 14 |
| 147μ (dry) | 46.5 | 8 | — | — | 88 |
| 44μ (moist) | 79 | 40 | — | — | 9.5 |
| Flowability | 15 s | 2 mn 50 s | | | 9 s |
| Rubber | | | | | |
| Cm | 9.5 | 10 | 10 | 8.5 | 7.5 | 7.0 |
| CM | 101 | 98.5 | 102 | 94 | 97 | 100 |
| Optimal Cure time | 5 mn 00 s | 4 mm 00 s | 5 mm 35 s | 4 mm 15 s | 4 mm 40 s | 5 mm 40 |
| Tensile strength kg/cm$^2$ | 138 | 127 | 85 | 139 | 134 | 134 |
| Dispersion | | | | | |
| Visual | xxx | xxx | 0 | xxx | 0 | xxx |
| Optical % at 3μ | 98 | 97 | 60 | 75 | 70 | 99 |
| Dust formation and abrasion as in DIN 53 583, in % by weight | | | | | 13 3 | 8.5 0.25 |

TABLE III

| FORMULATION | SBR 1 | | SBR 2 | | SBR 3 | | SBR 4 | |
|---|---|---|---|---|---|---|---|---|
| SBR 1509 | 90.00 | 90.00 | 95.00 | 95.00 | 95.00 | 95.00 | — | — |
| SBR 1712 | — | — | — | — | — | — | 60.00 | 60.00 |
| SBR 1220 | — | — | — | — | — | — | 40.00 | 40.00 |
| PEG 4000 | 3.00 | 3.00 | 2.40 | 2.40 | 2.40 | 2.40 | 3.00 | 3.00 |
| STEARIC ACID | 3.00 | 3.00 | 1.00 | 1.00 | 1.00 | 1.00 | 1.50 | 1.50 |
| ZINC OXIDE | 3.00 | 3.00 | 3.00 | 3.00 | 3.00 | 3.00 | 4.00 | 4.00 |
| PETROLEUM DISTILLATION OIL | — | — | — | — | — | — | 20.00 | 20.00 |
| SYNTHESIZED OIL | — | — | — | — | 15.00 | 15.00 | — | — |
| ANTIOXIDANT PERMANAX OD | 2.00 | 2.00 | 2.00 | 2.00 | 2.00 | 2.00 | — | — |
| ANTIOXIDANT PERMANAX IPPD | — | — | — | — | — | — | 1.50 | 1.50 |
| ANTIOXIDANT PERMANAX 6 PPD | — | — | — | — | — | — | 1.50 | 1.50 |
| MASTERBATCH A | 7.25 | 7.25 | — | — | — | — | — | — |
| MASTERBATCH B | 7.25 | 7.25 | 7.25 | 7.25 | 7.25 | 7.25 | — | — |
| SULFUR | — | — | — | — | — | — | — | — |
| VULACFOR CBS | — | — | 1.20 | 1.20 | 1.20 | 1.20 | 2.75 | 2.75 |
| VULCAFOR MBTS | — | — | 1.20 | 1.20 | 1.20 | 1.20 | — | — |
| VULCAFOR DOTG | — | — | 1.40 | 1.40 | 1.40 | 1.40 | — | — |
| VULCAFOR TMDT | — | — | 0.20 | 0.20 | 0.20 | 0.20 | — | — |
| SILICA AS IN EXAMPLE 5 | 50.00 | — | 40.00 | — | 40.00 | — | 60.00 | — |
| SILICA AS IN EXAMPLE 2 | — | — | — | 40.00 | — | 40.00 | — | 60.00 |

TABLE IV

| FORMULATION | POLYISOPRENE | | E.P.D.M. | | SBR IN SOLUTION | |
|---|---|---|---|---|---|---|
| NATSYN | 100.00 | 100.00 | — | — | 10.00 | 10.00 |
| SOLPRENE 1206 | — | — | — | — | 85.00 | 85.00 |
| KELTAN 6505 | — | — | 100.00 | 100.00 | — | — |
| ZnO (ACTIVE) | 2.50 | 2.50 | 5.00 | 5.00 | 3.00 | 3.00 |
| STEARIC ACID | 2.00 | 2.00 | 3.00 | 3.00 | 1.00 | 1.00 |
| PEG 4000 | 1.25 | 1.25 | 2.00 | 2.00 | 2.40 | 2.40 |
| ANTIOXIDANT PERMANAX OD | — | — | — | — | 2.00 | 2.00 |
| SYNTHESIZED OIL | — | — | 20.00 | 20.00 | — | — |
| MASTERBATCH B | — | — | — | — | 7.50 | 7.50 |
| SULFUR | 2.50 | 2.50 | 3.00 | 3.00 | — | — |
| VULCAFOR MBTS | 1.00 | 1.00 | — | — | 1.20 | 1.20 |
| VULCAFOR DOTG | 1.00 | 1.00 | — | — | 1.40 | 1.40 |
| VULCAFOR CBS | — | — | — | — | 1.20 | 1.20 |
| VULCAFOR TMDT | — | — | 1.00 | 1.00 | 0.20 | 0.20 |
| L.D.A. | — | — | 1.00 | 1.00 | — | — |
| M.B.T. | — | — | 1.00 | 1.00 | — | — |
| SILICA AS IN EXAMPLE 5 | 25.00 | — | 40.00 | — | 40.00 | — |
| SILICA AS IN EXAMPLE 2 | — | 25.00 | — | 40.00 | — | 40.00 |

TABLE V (RHEOLOGY)

| FORMULATIONS | SBR1 | | SBR 2 | | SBR 3 | | SBR 4 | |
|---|---|---|---|---|---|---|---|---|
| SILICA AS IN EXAMPLE | 5 | 2 | 5 | 2 | 5 | 2 | 5 | 2 |
| MINIMUM TORQUE | 9.0 | 8.0 | 7.5 | 10.0 | 7.0 | 7.0 | 16.0 | 17.0 |
| MAXIMUM TORQUE | 83.0 | 79.0 | 88.0 | 104.0 | 73.5 | 74.0 | 83.0 | 84.0 |
| OPTIMAL CURE TIME | 8 mn 30 s | 9 mn 00 s | 3 mn 40 s | 3 mn 45 s | 4 mn 30 s | 4 mn 45 s | 9 mn 00 s | 10 mn 45 s |

| FORMULATIONS | POLYISOPRENE | | E.P.D.M. | | SBR IN SOLUTION | |
|---|---|---|---|---|---|---|
| SILICA AS IN EXAMPLE | 5 | 2 | 5 | 2 | 5 | 2 |
| MINIMUM TORQUE | 10.0 | 10.5 | 10.5 | 12.0 | 11.5 | 12.5 |
| MAXIMUM TORQUE | 68.0 | 64.5 | 88.0 | 88.0 | 103.0 | 104.0 |
| OPTIMAL CURE TIME | 5 mn 15 s | 5 mn 00 s | 9 mn 00 s | 9 mn 15 s | 2 mn 45 s | 3 mn 00 s |

TABLE VI

| FORMULATIONS | SBR 1 | | SBR 2 | | SBR 3 | | SBR 4 | |
|---|---|---|---|---|---|---|---|---|
| SILICA AS IN EXAMPLE | 5 | 2 | 5 | 2 | 5 | 2 | 5 | 2 |
| TENSILE STRENGTH | 181 | 186 | 139 | 137 | 126 | 121 | 92 | 94 |
| SHORE HARDNESS A | 69 | 68 | 65 | 64 | 58 | 56 | 63 | 62 |
| MODULUS AT 100% | 16 | 16 | 18 | 16 | 14.0 | 13.0 | 14.0 | 12 |
| MODULUS AT 300% | 35 | 33 | 42 | 39 | 32.5 | 30.0 | 35.0 | 33 |
| ELONGATION, % | 620 | 640 | 530 | 540 | 570 | 550 | 520 | 535 |
| TEAR STRENGTH | 20.1 | 20.0 | 7.9 | 7.0 | 6.3 | 6.0 | 22.4 | 24.0 |
| DISPERSION | | | | | | | | |
| $8\mu$ | 99.7 | 99.2 | 99.9 | 99.8 | 99.5 | 99.4 | 99.6 | 99.1 |
| $3\mu$ | 99.7 | 98.5 | 99.9 | 99.3 | 98.7 | 98.5 | 98.9 | 98.1 |
| $0.7\mu$ | 99.2 | 98.2 | 99.5 | 99.4 | 97.0 | 97.5 | 97.0 | 96.5 |

TABLE VII

| FORMULATIONS | POLY-ISOPRENE | | E.P.D.M. | | SBR IN SOLUTION | |
|---|---|---|---|---|---|---|
| SILICA AS IN EXAMPLE | 5 | 2 | 5 | 2 | 5 | 2 |
| TENSILE STRENGTH | 272 | 270 | 89 | 92 | 110 | 114 |
| SHORE HARDNESS A | 53 | 52 | 63 | 62 | 68 | 68 |
| MODULUS AT 100% | 13 | 11 | 16 | 16 | 20 | 19 |
| MODULUS AT 300% | 31.2 | 28 | 36 | 35 | 44.5 | 41 |
| ELONGATION, % | 735 | 735 | 475 | 515 | 525 | 540 |
| TEAR STRENGTH | 23.5 | 22.0 | 7.2 | 7.9 | 6.1 | 6.0 |
| DISPERSION | | | | | | |
| $8\mu$ | 100.0 | 99.8 | 99.2 | 98.9 | 99.9 | 99.8 |
| $3\mu$ | 100.0 | 99.7 | 97.0 | 96.6 | 99.7 | 99.4 |
| $0.7\mu$ | 99.8 | 99.6 | 93.7 | 93.3 | 94.0 | 94.0 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Dry, dust-free and non-dusting, solid and homogeneous atomized precipitated silica particulates essentially spheroidal in geometrical configuration, said particulates having a mean particle size in excess of 150 microns, a fill density in compacted state in excess of 0.200, a BET surface area ranging from 100 to 350 $m^2/g$, and a CTAB surface area ranging from 100 to 350 $m^2/g$.

2. The precipitated silica particulates as defined by claim 1, said particulates having a specific volume in the range of from about 0.7 to 1.1.

3. The precipitated silica particulates as defined by claim 1, said particulates having a fill density in compacted state from about 0.28 to 0.32.

4. The precipitated silica particulates as defined by claim 1, wherein the mean particle size of said particulates is in the range of from about 200 to 300 microns.

5. A shaped article comprising an elastomeric matrix, said elastomeric matrix having well dispersed therein an effective reinforcing amount of dry, dust-free and non-dusting, solid and homogeneous atomized precipitated silica particulates essentially spheroidal in geometrical configuration, said particulates having a mean particle size in excess of 150 microns, a fill density in compacted state in excess of 0.200, a BET surface area ranging from 100 to 350 $m^2/g$, and a CTAB surface area ranging from 100 to 350 $m^2/g$.

6. The shaped article as defined by claim 5, said elastomeric matrix comprising a rubber.

7. The shaped article as defined by claim 5, said precipitated silica particulates having a specific volume in the range of from about 0.7 to 1.1.

8. The shaped article as defined by claim 5, said precipitated silica particulates having a fill density in compacted state from about 0.28 to 0.32.

9. Dry, dust-free and non-dusting, solid and homogeneous atomized precipitated silica particulates essentially spheroidal in geometrical configuration, said particulates having a mean particle size in excess of 150 microns, being free flowing to an extent of at least 10 times greater than in powder form, and said particulates having a fill density in compacted state in excess of 0.200, a BET surface area ranging from 100 to 350 m²/g, and a CTAB surface area ranging from 100 to 350 m²/g.

10. The precipitated silica particulates as defined in claim 9, said particulates having a specific volume in the range of from about 0.7 to 1.1.

11. The precipitated silica particulates as defined in claim 9, said particulates having a fill density in compacted state from about 0.28 to 0.32.

12. A shaped article comprising an elastomeric matrix, said elastomeric matrix having well dispersed therein an effective reinforcing amount of dry, dust-free and non-dusting, solid and homogeneous atomized precipitated silica particulates essentially spheroidal in geometrical configuration, said particulates having a mean particle size in excess of 150 microns, being free flowing to an extent of at least 10 times greater than in powder form, and said particulates having a fill density in compacted state in excess of 0.200, a BET surface area ranging from 100 to 350 m²/g, and a CTAB surface area ranging from 100 to 350 m²/g.

13. The shaped article as defined by claim 12, said elastomeric matrix comprising a rubber.

14. The shaped article as defined by claim 12, said precipitated silica particulates having a specific volume in the range of from about 0.7 to 1.1.

15. The shaped article as defined by claim 12, said precipitated silica particulates having a fill density in compacted state from about 0.28 to 0.32.

16. A process for the preparation of precipitated silica particulates which are essentially spheroidal in geometrical configuration, said particulates having a mean particle size in excess of 150 microns, a fill density in compacted state in excess of 0.200, a BET surface area ranging from 100 to 350 m²/g, and a CTAB surface area ranging from 100 to 350 m²/g, comprising:
   (i) formulating an aqueous slurry of precipitated silica having a content in dry solids in excess of 18% and said aqueous slurry having a pH of at least 4, and
   (ii) spraying to dryness said aqueous slurry by use of a liquid pressure nozzle, with the liquid pressure nozzle spraying being conducted at a pressure ranging from about 20 to 40 bars.

17. The process of claim 16, wherein the aqueous slurry is pulverized prior to atomization in order to reduce the particle size of the solids comprising a slurry such that no solids have a particle size of greater than 150 micron.

18. The process of claim 16, wherein the aqueous slurry of precipitated silica has a solids content in the range of from about 20 to 25%.

19. The process of claim 16, wherein the aqueous slurry of precipitated silica comprises precipitated silica filter cake.

20. The process of claim 19, wherein the precipitated silicate filter cake comprises recycled solids.

21. The process of claim 16, wherein the aqueous slurry has a pH of at least 4.5.

22. The process of claim 21, wherein the aqueous slurry has a pH in the range of from 4.5 to about 6.

23. A process for the preparation of precipitated silica particulates which are essentially spheroidal in geometrical configuration, said particulates having a mean particle size in excess of 150 microns, a fill density in compacted state in excess of 0.200, a BET surface area ranging from 100 to 350 m²/g, and a CTAB surface area ranging from 100 to 350 m²/g, comprising:
   (i) formulating an aqueous slurry of precipitated silica having a content in dry solids in excess of 18% and said aqueous slurry having a pH of at least 4.5, and
   (ii) spraying to dryness said aqueous slurry by use of a liquid pressure nozzle.

24. The process of claim 23, wherein the aqueous slurry is pulverized prior to atomization in order to reduce the particle size of the solids comprising a slurry such that no solids have a particle size of greater than 150 microns.

25. The process of claim 23, wherein the aqueous slurry of precipitated silica has a solids content in the range of from about 20 to 25%.

26. The process of claim 23, wherein the aqueous slurry of precipitated silica is comprised of precipitated silica filter cake.

27. The process of claim 26, wherein the precipitated silica filter cake is comprised of recycled solids.

28. The process of claim 23, wherein the precipitated silica filter cake is comprised of recycled solids.

* * * * *

UNITED STATES PATENT AND TRADEMARK OFFICE
CERTIFICATE OF CORRECTION

PATENT NO. : 6,013,234
DATED : January 11, 2000
INVENTOR(S) : Jean-Louis Ray; Maurice Coudurier Page 1 of 1

It is certified that error appears in the above-identified patent and that said Letters Patent is hereby corrected as shown below:

<u>Column 16, claim 28,</u>
Lines 40 and 41, please delete "the precipitated silica filter cake is comprised of recycled solids" and replace with -- the aqueous slurry has a pH in the range of from 4.5 to about 6 --.

Signed and Sealed this

Nineteenth Day of February, 2002

Attest:

Attesting Officer

JAMES E. ROGAN
*Director of the United States Patent and Trademark Office*